United States Patent
Claussen et al.

(10) Patent No.: US 6,233,514 B1
(45) Date of Patent: May 15, 2001

(54) METHOD FOR CONTROLLING THE DOWNHILL SPEED OF AN OFF-THE-ROAD VEHICLE

(75) Inventors: Heiko Claussen, Hannover; Jurgen Eickhoff, Walsrode, both of (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 09/359,182

(22) Filed: Jul. 22, 1999

(30) Foreign Application Priority Data

Aug. 8, 1998 (DE) ............................................. 198 35 937

(51) Int. Cl.$^7$ .............................. B60T 8/00; B60T 10/00; G05D 1/00; G06F 17/00
(52) U.S. Cl. ................................ 701/93; 701/64; 701/55; 701/86; 701/89; 701/91; 701/95; 303/191; 303/192; 303/193; 188/170; 188/179; 188/180
(58) Field of Search ................................ 701/93, 91, 95, 701/89, 86, 55, 64; 303/192, 191, 193; 188/180, 170, 179

(56) References Cited

U.S. PATENT DOCUMENTS

| | | | |
|---|---|---|---|
| 4,911,275 | 3/1990 | Ohkummo et al. | 477/87 |
| 5,305,662 | * 4/1994 | Togai et al. | 74/866 |
| 5,417,193 | * 5/1995 | Fillman et al. | 123/352 |
| 5,522,213 | * 6/1996 | Bustamente | 60/487 |
| 5,651,343 | * 7/1997 | Evans et al. | 123/339.26 |
| 5,722,912 | * 3/1998 | Narita | 477/64 |
| 5,913,746 | * 6/1999 | Bauerle | 477/47 |
| 6,017,290 | * 1/2000 | Kinoshita et al. | 477/108 |
| 6,067,492 | * 5/2000 | Tabata et al. | 701/51 |

FOREIGN PATENT DOCUMENTS

| | | |
|---|---|---|
| 2419242 | 10/1975 | (DE) . |
| 3736807 | 5/1989 | (DE) . |
| 4330391 | 10/1994 | (DE) . |
| 4420116 | 12/1996 | (DE) . |
| 19637297 | 3/1998 | (DE) . |
| 19648559 | 5/1998 | (DE) . |
| WO 9611826 | * 4/1996 | (GB) . |
| 9611826 | 4/1996 | (WO) . |

* cited by examiner

Primary Examiner—William A. Cuchlinski, Jr.
Assistant Examiner—Ronnie Mancho
(74) Attorney, Agent, or Firm—Proskauer Rose LLP

(57) ABSTRACT

A method for controlling the speed of an off-the-road vehicle traveling on a gradient permits a constant downhill speed to be maintained. The vehicle speed can be set to a constant descending speed by an electronic system through active braking intervention, without requiring actuation of the brake by the driver. The vehicle in which the method is practiced has several forward speeds and one reverse speed within a low-range traveling phase. The constant descending speed is dependent upon the position of the gas pedal and upon the currently engaged gear of the low-range traveling phase. The method for use in off-the-road vehicles is particularly advantageous for situations in which the braking action of the engine on steep gradients is no longer sufficient to decelerate the vehicle.

12 Claims, 2 Drawing Sheets

METHOD FOR CONTROLLING THE DOWNHILL SPEED OF AN OFF-THE-ROAD VEHICLE

BACKGROUND OF THE INVENTION

The present invention relates to a method for controlling the downhill speed of an off-the-road vehicle, and more particularly to a method by which the vehicle speed can be set to a constant descending speed by an electronic system operating a braking system with active brake intervention within a low-range traveling phase.

Known devices for maintaining a constant speed desired by the driver through automatic application of the brakes, a process referred to as "active braking," are already provided in road vehicles. As a general rule, such vehicles are equipped with an anti-locking brake system (ABS), as well as with an anti-slip regulation (ASR) system. The operating components already present in such systems, such as, the electronics, wheel speed sensors, solenoid control valves, etc., are used also to carry out the above-mentioned speed regulation. Such known active braking devices relieve the driver of the task of having to constantly actuate the brake pedal during travel on a downhill stretch. In addition, a uniform speed is evenly maintained in a reliable manner over varying gradients.

An electrical/pneumatic braking force regulating circuit is known, for example, from German application DE-A-24 19 242. In accordance with such circuit, the vehicle speed while traveling on a gradient is maintained by active braking initiated when neither the gas nor the brake pedal is actuated. Such speed regulation is terminated in immediate response to actuation of any one of the above-mentioned pedals, or when the superimposed ABS becomes active.

Another known method is disclosed, for example, in WO 96/11826 A1, in which a vehicle is equipped with a system for downhill control, also referred to as "hill descent control" (HDC). The control system disclosed therein can be activated by the driver by means of a switch. When activated, such system maintains the vehicle on a steep gradient at a constant low speed by means of active, controlled braking, thereby obviating actuation of the brakes by the driver. This system is particularly intended for off-the-road vehicles traveling on a gradient that is so steep that the engine braking effect is no longer sufficient to decelerate the vehicle, even in the lowest gear.

Finally, a process for controlling the speed of a vehicle on a descending gradient is disclosed in German patent DE 196 48 559 (corresponding to Ser. No. 08/970,988 of the inventors herein), whereby the vehicle speed can be set to a constant downhill speed by means of an electronic system through active braking intervention. In accordance with the process, a continuously adjustable target speed to which the current vehicle speed is set is synthesized within the electronic system to achieve a comfortable transition from the vehicle speed and the constant downhill speed, resulting in a continuous transition to the constant downhill speed.

It is the object of the present invention to provide a method for controlling downhill speed by means of which active, controlled braking of an off-the-road vehicle with several gears takes place in an especially comfortable manner in a low-range traveling speed range.

SUMMARY OF THE INVENTION

In accordance with these and other objects of the invention, there is provided a method for controlling the speed of an off-the-road vehicle descending a steep gradient to a constant descending speed. The vehicle in which the method is applied is equipped with several forward gears and a reverse gear.

The value of the constant descending speed is determined as a function of the position of the butterfly valve and the currently engaged gear of the vehicle. The braking system is then electronically controlled with active brake intervention to bring the actual vehicle speed into conformance with the constant descending speed.

The above, and other objects, features and advantages of the present invention will become apparent from the following description read in conjunction with the accompanying drawings, in which like reference numerals designate elements providing the same function.

DETAILED DESCRIPTION OF THE PREFERRED EMBODIMENT

Figure 1:
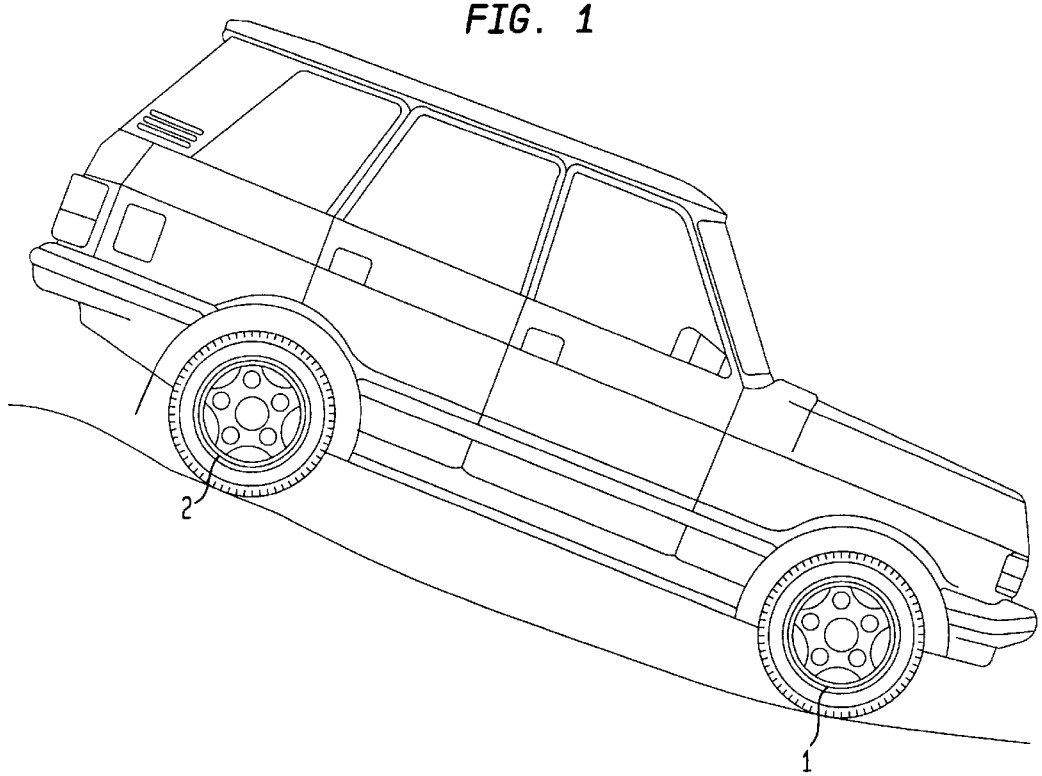
FIG. 1 is an elevational view of an off-the-road vehicle during down-hill travel.

Referring now to the figures, and in particular FIG. 1, a vehicle in downhill travel is depicted. Due to its inclined position during such travel, the vehicle includes a lower axle 1 and a higher axle 2. The descent of the vehicle can take place in forward travel, as shown, as well as in reverse travel.

Figure 2:
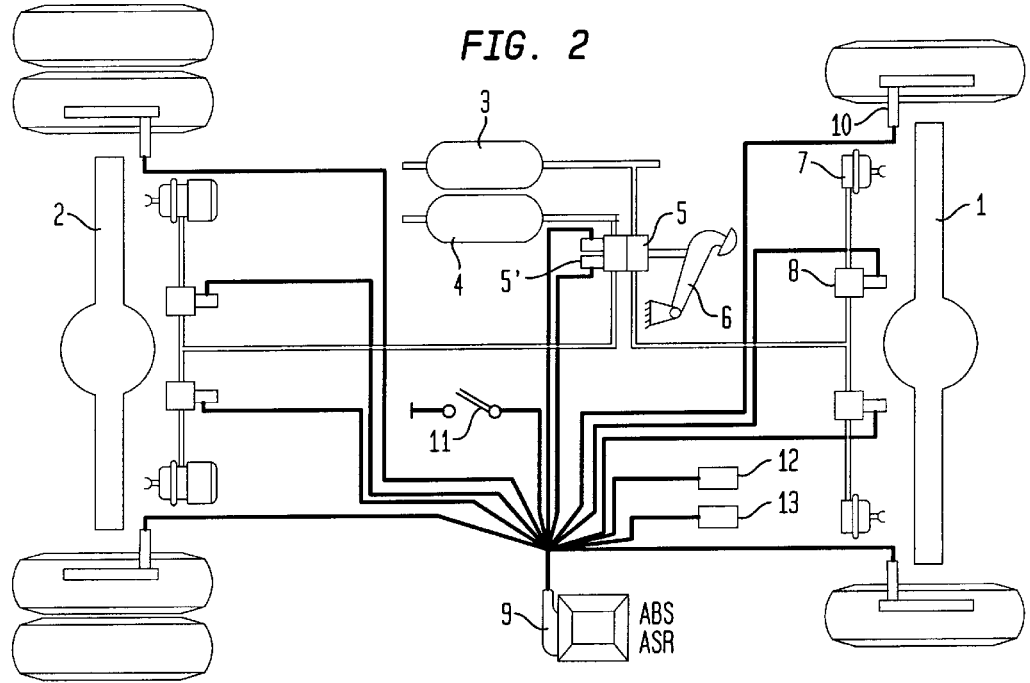
FIG. 2 is a schematic representation of the pneumatic and the electronic braking system of the vehicle of FIG. 1.

FIG. 2 schematically depicts the electronic, as well as the pneumatic, systems of the vehicle of FIG. 1. Instead of employing the pneumatic braking system, as shown, it is possible instead to provide a hydraulic or a mixed braking system.

As shown in FIG. 2, the vehicle includes two axles 1 and 2. Two supply containers 3, 4 separately provide a supply of pressure medium for the braking system of each axle. The pressure medium is conveyed to wheel brake cylinders 7 via a brake valve 5 which is actuated by means of a brake pedal 6. ABS/ASR solenoid control valves 8 precede the brake cylinders 7. The brake valve 5 is additionally provided with an ASR solenoid valve 5', since braking pressure must be allowed to pass through to the individual wheels during an ASR regulation without requiring actuation of the brake pedal 6.

An ABS/ASR electronic system 9 for controlling the above-mentioned solenoid valves is provided, and which is connected to the solenoid valves 8 via electrical connecting circuits. The electronic system 9 receives information on the wheel behavior of each individual wheel through wheel sensors 10. In addition, a sensor 12, which senses the positions of the butterfly valve or the gas pedal of the vehicle (not shown), and a transmission sensor 13 are connected to the electronic system 9. An actuating switch 11 is provided for activation of the active braking (HDC) function. FIG. 2 depicts pneumatic and hydraulic circuits in the form of an alternating black/white line pattern, while electrical circuits are represented by thin, continuous lines.

The functioning of the vehicle-installed device during controlled downhill travel will now be explained in further detail. The "controlled downhill travel" function is activated either automatically by the electronic system 9, or by the driver by actuating switch 11. Following such activation, the driver removes his foot from the brake pedal or gas pedal. As soon as the downhill travel control begins to function, the ASR solenoid valve 5' is excited and braking pressure is thereby brought to bear directly on the brake cylinders 7 of the wheels of the front axle 1 (active braking). The electronic system 9 controls the speed of the vehicle through appropriate triggering of the solenoid control valves 8 in such manner that a predetermined speed is set and maintained independently of changes in the gradient.

It is understood that actively braked downhill travel occurs only when the vehicle is not sufficiently decelerated by the braking action of the engine alone.

If a wheel experiences locking during a period of controlled downhill travel, the described HDC function is replaced immediately by the normal ABS function. Operation with controlled downhill speed must also be circumvented when the driver wishes to decrease or increase the previously selected constant speed by actuating the brake pedal or the gas pedal.

In order to avoid overheating of the brakes during a long period of controlled downhill travel, it is advantageous to monitor brake temperature and to alert the driver by means of a warning system in the event that a limit value is exceeded. The driver can then stop the vehicle, and resume travel when the brakes have sufficiently cooled. For implementing such brake temperature monitoring, the brake temperature can be measured directly by temperature sensors (not shown) on the wheel brakes, or, alternatively, the brake temperature can be simulated by an electronic model within the electronic system 9. Although the second option is less precise than actual measurement, it is nevertheless more economical.

Figure 3:
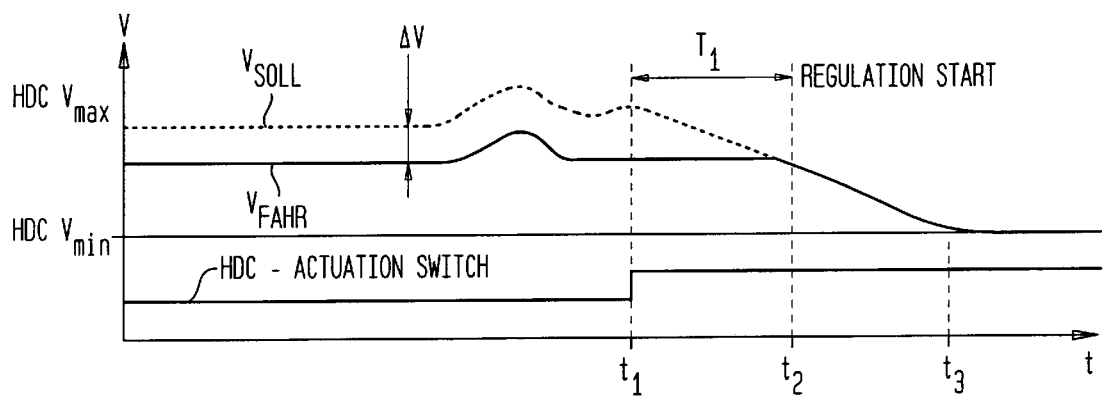
FIG. 3 is a graphical representation of an HDC control process.

An accurate representation of the transition of the vehicle speed $V_{Fahr}$ to the controlled, constant downhill travel speed HDC $V_{min}$ on a descending gradient is shown in the diagram of FIG. 3.

The vehicle travels at a current vehicle speed $V_{Fahr}$ (continuous line). At the same time a target speed $V_{soll}$ (dotted line), which is initially greater than the vehicle speed $V_{Fahr}$ by an amount $\Delta V$, is produced within the electronic system 9. A typical value for $\Delta V$ at such point in time is about 5 to 7 km/h. The value of $\Delta V$ may also be determined as a function of speed, whereby the value increases with the vehicle speed. In FIG. 3, the vehicle speed $V_{Fahr}$ is below a value HDC $V_{max}$, which represents the maximum admissible HDC speed. The latter is approximately 50 km/h, above which, no downhill speed control is provided.

In the plot of FIG. 3, the driver actuates the actuating switch 11 at a point in time $t_1$, and thus switches on the HDC function. The driver then takes his foot off the gas pedal or brake. The target speed $V_{soll}$ is then slowly lowered by the electronic system 9 in order to achieve a gentle transition to the value HDC $V_{min}$. At a point in time $t_2$, the curve of the target speed $V_{soll}$ converges with the curve of the vehicle speed $V_{Fahr}$. From this point on, the active braking of the vehicle begins. The vehicle speed $V_{Fahr}$ is adjusted to the target speed $V_{soll}$ so that both curves now coincide with one another. At a point in time $t_3$, the final speed HDC $V_{min}$ is reached. The vehicle is then automatically held at this constant descending speed until the actuating switch 11 is again switched off. The time $T_1$ between the actuation of the actuating switch 11 at point in time $t_1$ and the intersection point of target speed $V_{soll}$ and vehicle speed $V_{Fahr}$ representing the beginning of control at point in time $t_2$ depends on the previous vehicle behavior (acceleration or deceleration), on the increase of $V_{soll}$ and on the amount of $\Delta V$. The time $T_1$ is typically approximately 0.5 seconds.

If the driver wishes to increase the travel speed during the above-described controlled downhill operation, he need only push down slightly on the gas pedal. The position of the gas pedal or the butterfly valve is sensed and transmitted to the electronic system 9 by the sensor 12.

Figure 4:
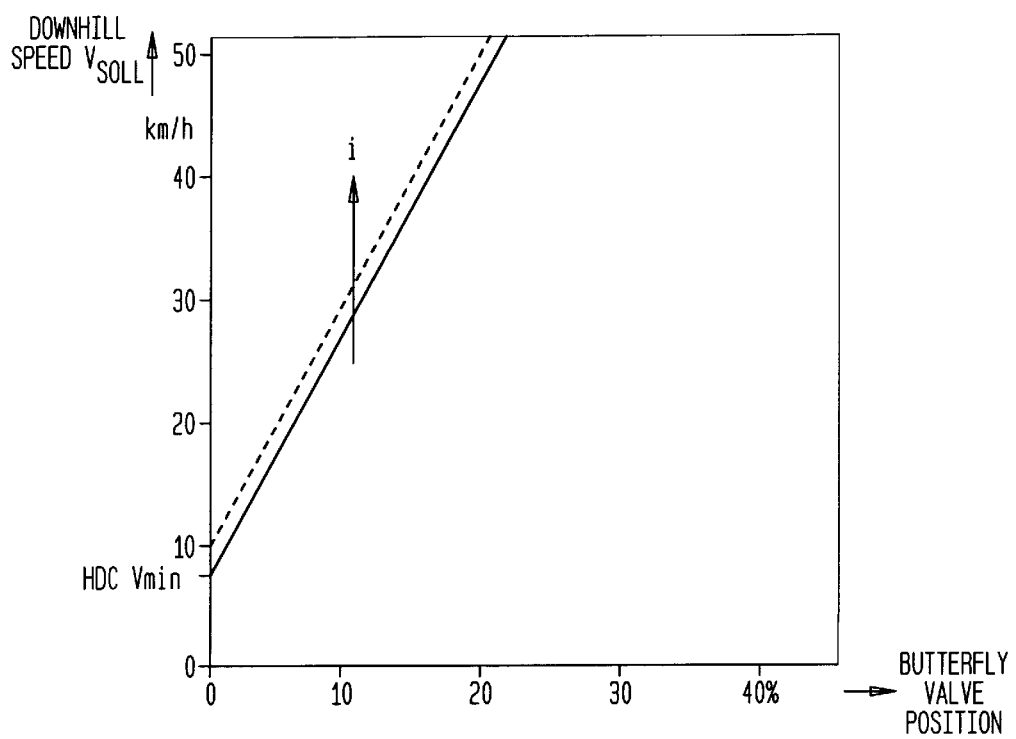
FIG. 4 is a graphical representation in which the descending speed of the vehicle is plotted as a function of the position of the butterfly valve.

As shown in FIG. 4, the electronic system 9 then increases the constant downhill speed $V_{soll}$ of the vehicle in an approximately linear function of the butterfly valve position, from the minimum speed HDC $V_{min}$, to a new speed which is a function of the position of the butterfly valve. As shown in FIG. 4, the new downhill speed $V_{soll}$ for a butterfly valve position of, for example, 10%, is then approximately 30 km/h.

The value of the minimum speed HDC $V_{min}$ entered in FIG. 4, i.e. the descending speed $V_{soll}$ without actuation of the gas pedal, as well as the drawn curve of the descending speed $V_{soll}$ with actuation of the gas pedal, are further dependent upon the currently engaged gear i. When a higher gear i of the low-range travel phase is engaged, the curve shifts upwardly, in a parallel manner (shown as a broken line). Information on the currently engaged gear i therefore continues to be transmitted to the electronic system 9. This gear can be sensed by the transmission sensor 13.

Alternatively, the engaged gear i can also advantageously be calculated from the wheel rpm's VR and the engine rpm's VM according to the formula:

$$i = \frac{k \times VM}{(\text{Sum } VR)/n}$$

where:
k=a fixed factor which takes into account the translation of the axle differential, and
n=number of wheels.

Determination of the engaged gear i by way of this calculation makes it possible to dispense with a special transmission sensor 13. Sensors for the wheel rpm's VR and the engine rpm's VM are normally already present in the vehicle.

In travel tests, it has been found that the following values are the most advantageous for the minimum descending speed HDC $V_{min}$, i.e. the speed which is set without actuating the gas pedal. For an average off-the-road vehicle with manually switched transmission, the values are approximately 7 km/h in the first gear of the low-range travel phase, approximately 8 km/h in the second gear, approximately 10 km/h in the third gear, approximately 12 km/h in the fourth gear, approximately 14 km/h in the fifth gear and approximately 6 km/h in reverse.

The curve drawn in FIG. 4 shifts upwardly in parallel towards the top of the chart as a function of the selected gear i, as indicated by the depicted arrow.

With automatic transmissions, only a differentiation between the travel phases 1 and 2 or 3 and D is possible by means of the above-mentioned formula because of the slip in the converter. The corresponding values for the minimum descending speed HDC $V_{min}$ are, in this case, approximately 12 km/h for the forward phases and 6 km/h for the reverse phase.

As a further option, idling recognition of a depressed clutch is advantageously provided, since, in either case, the braking action of the engine during the active braking phase on a gradient is no longer available. As a result, the brakes are overloaded, i.e. heated, more quickly. When such undesirable operating state is recognized, a warning to the driver is provided by means of a warning light or an acoustic signal emitter (not shown).

The position indicative of the state of "gear-in-neutral", i.e. representative of idle as well as an engaged position of the coupling pedal of the clutch, can be detected through special sensors (not shown).

It is, however, deemed particularly advantageous to recognize either of the two above-mentioned positions through an evaluation of the above formula:

$$i = \frac{k \times VM}{(\text{Sum } VR)/n}$$

Expensive sensors can thereby be avoided. Since a clear correlation between engine rpm's and wheel rpm's is not applicable in the two cases, i.e. the value calculated for the gear i does not yield a fixed number, it may consequently be assumed by the electronic evaluating system 9 that at least one of the two undesirable conditions of idling or depressed clutch is present.

Having described preferred embodiments of the invention with reference to the accompanying drawing, it is to be understood that the invention is not limited to those precise embodiments, and that various changes and modifications may be effected therein by one skilled in the art without departing from the scope or spirit of the invention as defined in the appended claims.

What is claimed is:

1. A method for controlling the speed of an off-the-road vehicle in a Hill Descent Mode, wherein the Hill Descent Mode is actuable when the vehicle is in a low-range traveling phase comprising a plurality of forward gears and a reverse gear, and the vehicle is descending a steep gradient, said method comprising in the Hill Descent Mode:

determining a position of a butterfly valve and a currently engaged gear of the low-range traveling phase;

setting a value of a constant descending speed as a function of the position of the butterfly valve and the currently engaged gear of the low-range traveling phase; and electronically controlling a braking system with active brake intervention to bring the vehicle speed into conformance with the constant descending speed.

2. The method according to claim 1, wherein the position of the butterfly valve is recognized by a gas pedal sensor in said step of determining.

3. The method according to claim 1, wherein the engaged gear is recognized by a transmission sensor in said step of determining.

4. The method according to claim 1, wherein said step of determining includes calculating the currently engaged gear according to the formula:

$$i = \frac{k \times VM}{(\text{Sum } VR)/n}$$

where:

i=the currently engaged gear
   VR=wheel rpm's
   VM=engine rpm's
   k=a fixed factor which takes into account the translation of the axle differential, and
   n=number of wheels.

5. The method according to claim 1, wherein the constant descending speed depends upon the currently engaged gear.

6. The method according to claim 1, wherein the constant descending speed is lowest in reverse travel relative to travel in other gears.

7. The method according to claim 1, further comprising detecting a gear-in-neutral state.

8. The method according to claim 7, wherein detection of the gear-in-neutral state is indicative of idling.

9. The method according to claim 7, wherein detection of the gear-in-neutral state is indicative of a depressed clutch.

10. The method according to claim 7, wherein said step of detecting the gear-in-neutral state includes evaluating the formula:

$$i = \frac{k \times VM}{(\text{Sum } VR)/n}$$

where:

i=a currently engaged gear
   VR=wheel rpm's
   VM=engine rpm's
   k=a fixed factor to take into account the translation of the axle differential, and
   n=number of wheels
   and wherein the gear-in-neutral state is recognized when a value calculated for the currently engaged gear does not yield a fixed number.

11. The method according to claim 7, further comprising emitting an acoustic warning when the gear-in-neutral state is recognized.

12. The method according to claim 7, further comprising emitting an optical warning when the gear-in-neutral state is recognized.

* * * * *